UNITED STATES PATENT OFFICE.

PAUL JÖRN, OF HAMBURG, GERMANY.

PROCESS OF PRESERVING HAMS.

1,036,254.

Specification of Letters Patent. Patented Aug. 20, 1912.

No Drawing.

Application filed August 4, 1909. Serial No. 511,217.

*To all whom it may concern:*

Be it known that I, PAUL JÖRN, a citizen of Hamburg, and resident of No. 101 Lübeckerstrasse, Hamburg, in the Empire of Germany, have invented a new and useful Process of Preserving Hams, of which the following is a specification.

The present invention relates to an improved process for preserving hams, so that the latter are distinguished from the hams preserved according to the hitherto known methods, by their practically permanent durability, which enables their export to tropical countries without deteriorating the quality, and by their exceptional flavor and taste in comparison with the ordinary boiled hams and ham preserves of a similar kind. These advantages in the process of this invention are mainly due to the preparation of the hams under exclusion of air and water, care being taken in the curing of the hams that every loss in meat juice is prevented and owing to the packing and canning the hams in such a manner, that air spaces are completely avoided.

The invention is hereinafter described generally in connection with the preserving of hams but it is to be understood that it can equally well be applied to the preserving of other joints or sections of meat.

In order to preserve hams according to the process forming the subject of the present invention, the hams are first of all salted and smoked in the well-known way. Thereupon the bones are removed from the hams by means of specially shaped knives, without opening the hams or loosening the meat. These boneless hams are dipped in boiling water for a few moments in order to exterminate the atmospheric bacteria and sterilize the hams in their interior. Subsequently the hams are tightly inserted into cast-iron molds of approximately the shape of the hams and subjected to heavy pressure therein, to regain the normal ham configuration on the one hand, and to close the cavity produced by the removal of the bones, on the other hand. While in the aforesaid closed molds, the hams are half cooked in their own meat juice without any addition of water, and immediately thereafter they are packed in tinned cans of approximately the shape of the hams. Each such tinned can, after being closed by a hermetically fitting cover having a little vent hole, is inserted in a vacuum chamber and the air from within it is exhausted, and while the said can is still *in vacuo*, the vent hole in the cover is closed by soldering in any suitable well-known way. It is evident that the vent hole may be provided in the body of the can, instead of the cover, if required.

An essential feature of the invention consists in carrying the air exhaustion so far, that on removing the evacuated and hermetically sealed tinned can from the vacuum chamber, the pressure of the atmosphere acting externally upon the can causes the walls of the latter to collapse at all those parts, at which the ham is not in contact with them. This collapse of the tinned cans by the pressure of the atmosphere is of special advantage for the hams contained in the cans, for the reason that the hams are automatically tightly packed all around and can consequently be preserved in their own meat-juice without any liquid addition, which is highly beneficial not only for their flavor but also for the durability for any length of time and in all climates. The compression of the tinned cans, due to the collapse of the tinned cans, closes all the cavities in the meat, the hams assuming the appearance of one homogeneous mass of meat in the subsequent distribution thereof.

The evacuated and hermetically sealed cans are heated for about an hour in an air bath, for the purpose of absolutely sterilizing their contents and for the completion of the cooking process of the hams in their own meat juice.

By virtue of the aforedescribed special process the preserved hams retain all the beneficial ingredients and properties of the meat in palatable form, suffering no loss whatever in meat or juice. In the customary methods of curing and preserving hams the natural meat juice is lost almost entirely, causing sometimes differences between the original and the final weight of the hams up to 25%, quite apart from the fact that every meat loses in quality by a prolonged immersion in or contact with liquids.

The absence of all liquid contents in the tinned cans offers an appreciable advantage to the consumer, in so far, that the purchaser buys meat only and not added matter of reduced monetary value.

What I do claim as my invention, and desire to secure by Letters Patent, is:—

The process of preserving a ham consisting in salting and smoking the said ham, removing the bones therefrom, dipping the ham in boiling water, compressing the ham in a mold of approximately its own shape, partly cooking the ham in the said mold, packing the ham in a can of approximately its own shape, sealing to the can a cover having a vent hole, exhausting the air from the can through the vent hole, hermetically sealing the vent hole, the walls of the can being so weak and the exhaustion of air from the can being carried so far that the pressure of the atmosphere thereon collapses the walls thereof tightly on to the ham, and finally processing the sealed can.

In witness whereof I have hereunto signed my name this 26th day of July 1909, in the presence of two subscribing witnesses.

PAUL JÖRN.

Witnesses:
ERNEST H. L. MUMMENHOFF,
IDA CHRIST. HAFERMANN.